United States Patent [19]

Preston et al.

[11] Patent Number: 5,616,838
[45] Date of Patent: Apr. 1, 1997

[54] METERING APPARATUS FOR CRYOGENIC LIQUIDS

[75] Inventors: Duane Preston, New Prague; Tom Drube, Lakeville; Paul Drube, Apple Valley, all of Minn.

[73] Assignee: MVE, Inc., New Prague, Minn.

[21] Appl. No.: 606,640

[22] Filed: Feb. 26, 1996

[51] Int. Cl.⁶ .................................................. B67D 5/378
[52] U.S. Cl. ............................................ 73/195; 62/50.1
[58] Field of Search .......................... 73/195, 149; 22/40, 22/54, 61, 64, 67, 71, 318; 62/50.1, 50.4, 50.6, 50.7

[56] References Cited

U.S. PATENT DOCUMENTS

| | | | |
|---|---|---|---|
| 4,005,603 | 2/1977 | Golahny et al. | 73/861.03 |
| 4,592,205 | 6/1986 | Brodbeck et al. | 62/50.1 |
| 4,597,507 | 7/1986 | Rosenblum et al. | 222/40 |
| 5,360,139 | 11/1994 | Goode . | |
| 5,365,981 | 11/1994 | Peschka et al. | 62/50.1 |

FOREIGN PATENT DOCUMENTS 9105986  5/1991  WIPO ........................... 222/40

*Primary Examiner*—Robert Raevis
*Attorney, Agent, or Firm*—Rudnick & Wolfe

[57] ABSTRACT

A cryogenic meter is mounted in an insulated container having an inlet and outlet in circuit with the LNG delivery flow path. The container is filled with LNG to a level above the cryogenic meter to pre-cool it to a desired operating temperature. To maintain the level of LNG in the container during use and to separate vapor from liquid, a float device allows vapor to be returned to the storage tank from the container to refill it with LNG. Because the meter is continuously immersed in LNG during use, it is maintained at a constant temperature permitting the quantity of LNG delivered to a use device to be accurately metered. Temperature and/or pressure signals are sent to a microprocessor which computes the density of the LNG and displays the metered amount of LNG on a display.

9 Claims, 2 Drawing Sheets

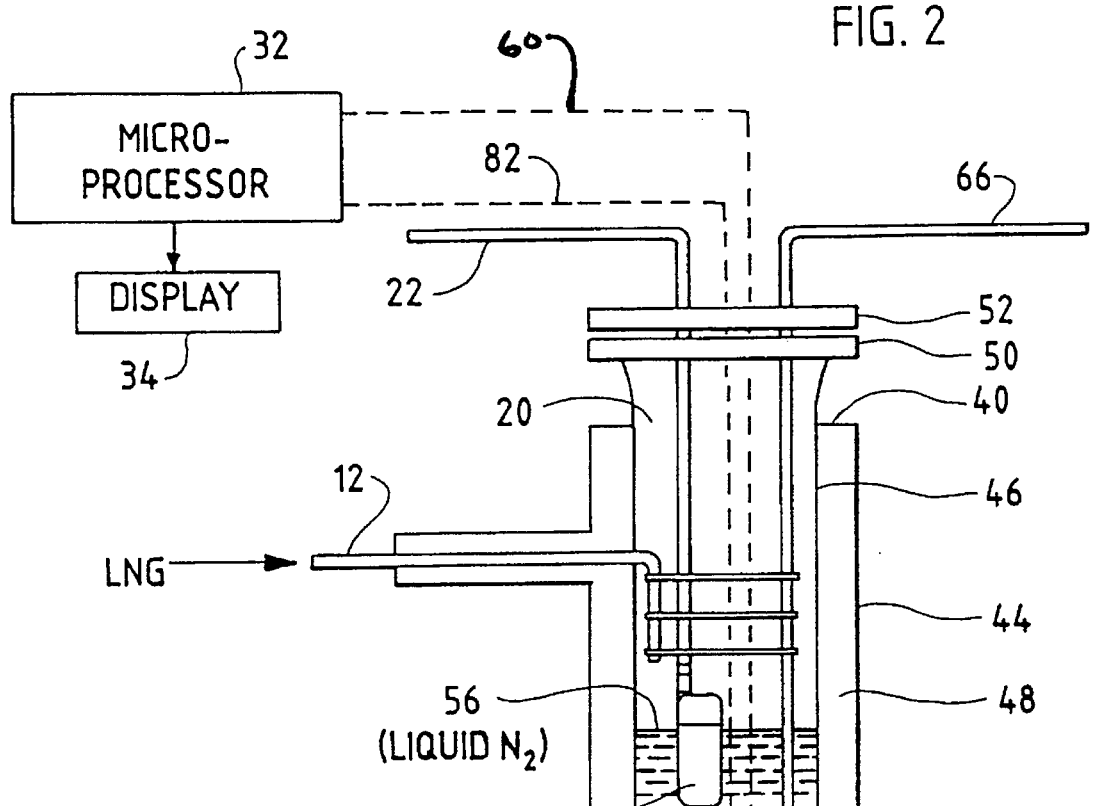
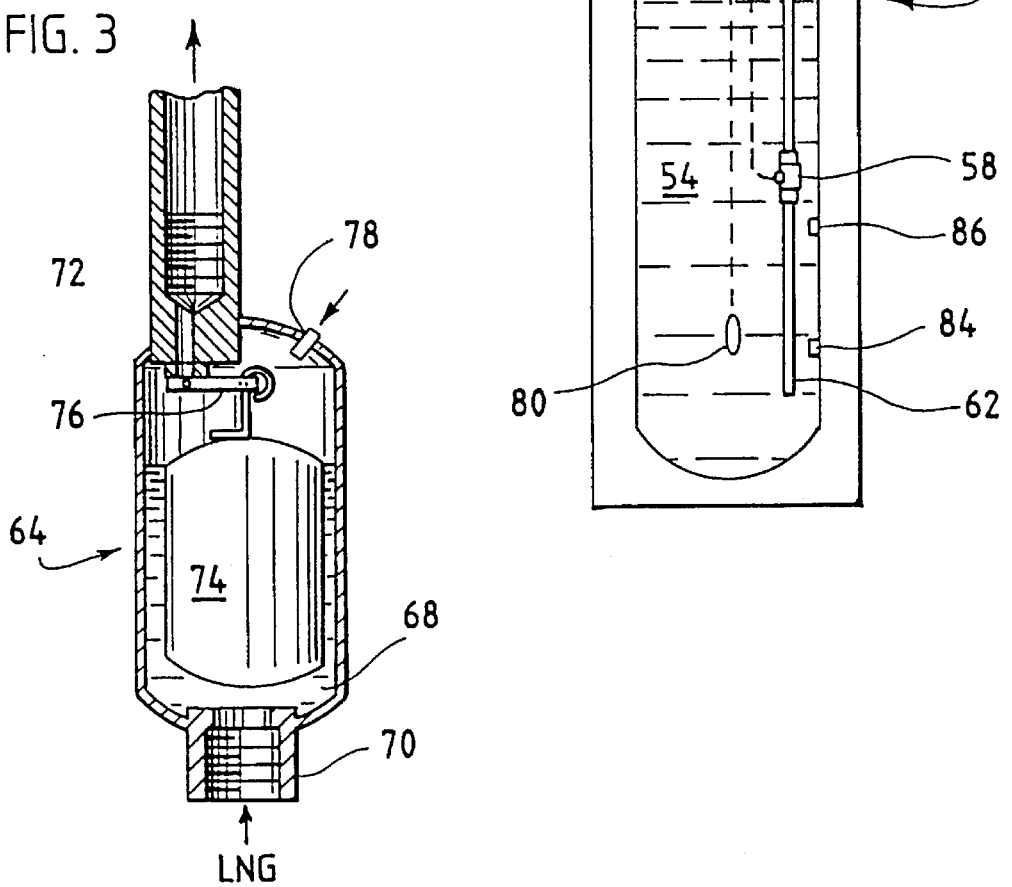

METERING APPARATUS FOR CRYOGENIC LIQUIDS

BACKGROUND OF THE INVENTION

The present invention generally relates to delivery systems for cryogenic liquids and, more particularly, to an apparatus for use therewith to permit accurate metering of the quantity of a cryogenic liquid, such as liquid natural gas, delivered to a use device.

Liquid natural gas (LNG) is one alternative energy source which is domestically available, environmentally safe and plentiful when compared to oil. Because one of the largest uses of oil is to power motor vehicles, great efforts have been made to develop natural gas engines and systems for delivering natural gas from a storage tank to the engines.

A major problem associated with the delivery of a liquid cryogen from a storage tank to a use device is two phase flow wherein the stream delivered to the use device includes both liquid and gas. This problem is of particular importance in the context of accurately measuring the quantity of LNG delivered to a vehicle for use as fuel. Heat causes the LNG to gasify thereby producing two phase flow and entraining vapor in the fuel delivered to the vehicle. This problem makes measuring the quantity of LNG delivered very difficult. Prior efforts to solve this problem, such as disclosed in U.S. Pat. No. 5,360,139, include circulating the product either continuously or before each delivery to cool down the meter. This introduces considerable heat into the stored liquid causing undersirable pressure increases and likely leads to product venting. Such systems may also provide a path back to the storage tank of the metered product. A leaky valve could return product to the storage tank that the meter has indicated as being delivered to the customer.

Another shortcoming of current systems is inaccurate density determination due to inaccurate temperature measurement.

Therefore, it is desirable to develop an apparatus for use with a cryogenic liquid delivery system to permit the quantity of fuel delivered to a use device to be accurately metered. The present invention overcomes both of these problems resulting in more accurate product metering.

SUMMARY OF THE INVENTION

To accurately meter the quantity of LNG delivered to a use device from a storage tank, a cryogenic meter is mounted in an insulated container having an inlet and outlet in circuit with the LNG delivery flow path. At system start-up, the container is filled with LNG to a level above the cryogenic meter to cool the meter to a desired operating temperature. A device maintains the level of LNG in the insulated container above the level of the meter by releasing vapor back to the storage tank when the LNG level falls below a predetermined level. Because the meter is continuously immersed in LNG during use, it is maintained at a constant temperature permitting the quantity of LNG delivered to a use device to be accurately metered while minimizing inaccuracies due to two phase flow.

A temperature sensor is mounted at a fixed, predetermined point in the container, submerged deeply in the LNG to measure its temperature. The temperature signal is sent to a microprocessor which computes the density of the LNG thereby to permit accurate measurement of the LNG flow. Alternatively, two pressure sensors can be mounted in the container at known positions to permit the LNG density to be calculated as a function of the differential pressure between the sensors. The microprocessor is connected to an external display which provides a visual reference of the quantity of LNG delivered.

BRIEF DESCRIPTION OF THE DRAWINGS

FIG. 2 is a cross-sectional view of the cryogenic metering container shown in FIG. 1.

FIG. 3 is a cross-sectional view of a typical float device shown in FIG. 2.

DESCRIPTION OF THE INVENTION

Figure 1:
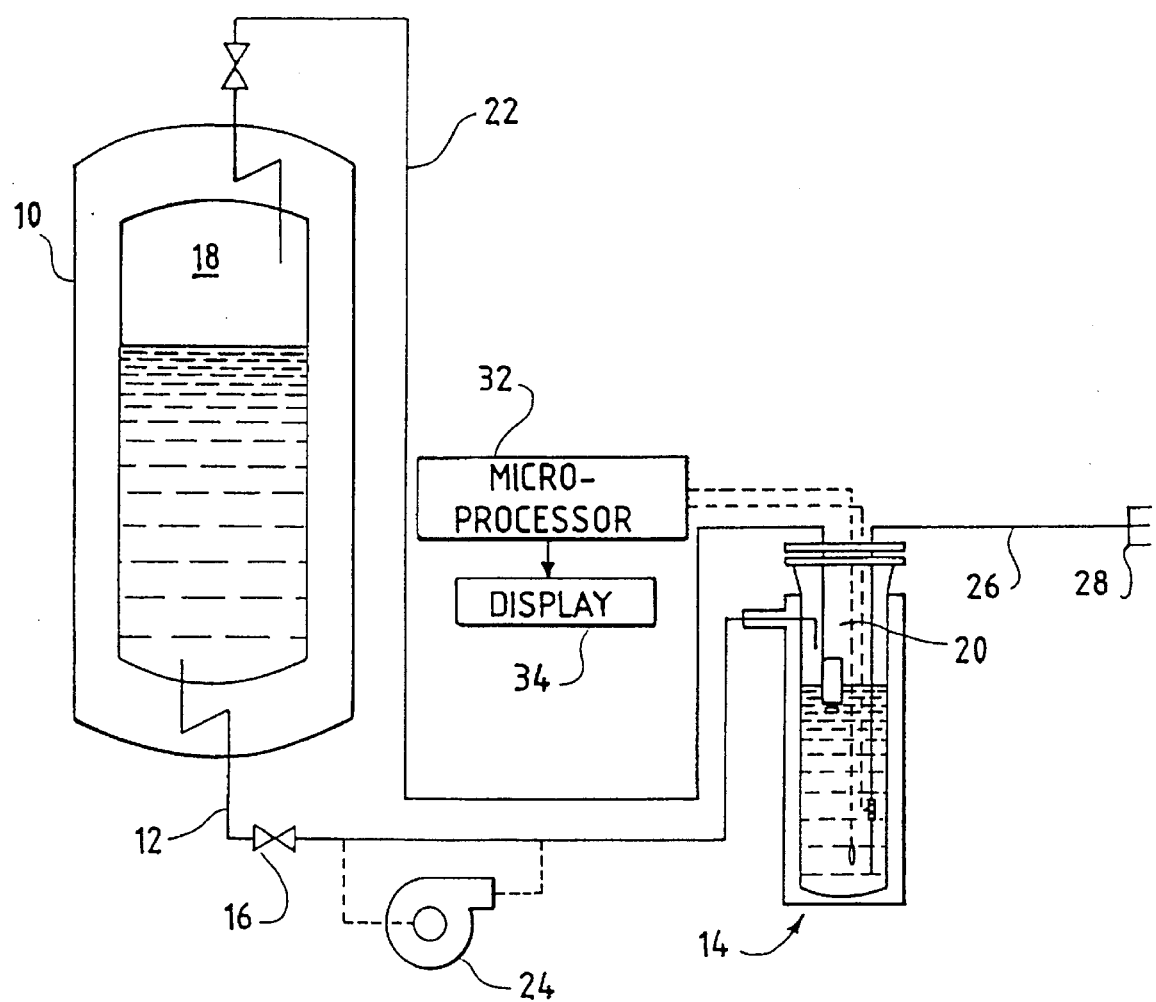
FIG. 1 is a schematic, block diagram illustrating the use of a cryogenic metering container with an LNG delivery system.

FIG. 1 illustrates a filling station for delivering metered quantities of LNG to a use device. The filling station includes a storage tank 10 for storing a large volume of LNG at low pressure. An insulated line 12 connects the storage tank 10 to a cryogenic metering container 14. Line 12 includes a shut-off valve 16. The vapor spaces 18 and 20 of storage tank 10 and cryogen metering container 14 are interconnected by a line 22.

A cryogenic liquid pump 24 is incorporated in line 12 to initiate the transfer of LNG from storage tank 10 to a use device or alternatively transfer can be accomplished by differential pressure between the storage tank 10 and the use device. LNG flows from metering container 14 through line 26. Line 26 includes a valve (not shown) and terminates in a disconnect coupling 28 that can be removably connected to a corresponding disconnect coupling on a use device such as a vehicle. The metered amount of LNG delivered to the use device is determined by microprocessor 32 and is displayed to the user on display 34.

FIG. 2 is a cross-sectional view of the cryogenic metering container 14 shown in FIG. 1. Metering container 14 comprises an outer jacket 44 in which an inner metering chamber 46 is positioned. Insulation 48 is positioned in the annular space between jacket 44 and chamber 46. The outer jacket 44 is attached, preferably welded, to a disk 40 which seals the annular space between chamber 46 and jacket 44. A flange 52 is removably attached to flange 50 to allow access to the interior of the inner chamber 46 for service. If desired, the annular space can be evacuated to enhance the effect of insulation 48.

LNG from storage tank 10 (FIG. 1) enters the insulated chamber 46 via line 12 resulting in a vapor space 20 above liquid LNG layer 54. At system start-up, vapor from space 20 escapes through device 64 until chamber 46 is filled with LNG to level 56. A cryogenic meter 58 is mounted in insulated chamber 46 below level 56 to measure the flow rate of LNG delivered to the use device. A signal proportional to the flow rate is delivered to microprocessor 32 via wire 60. LNG is fed from the bottom of chamber 46 to meter 58 via pipe 62 and to a use device via pipe 66 and line 26. Vapor space 20 is connected to the vapor space 18 of storage tank 12 (FIG. 1) by vapor return line 22.

Device 64 maintains the desired level of LNG to ensure that the cryogenic meter 58 is continuously immersed in LNG during use. Thus, when the level of LNG drops below level 56, gas is vented via vapor return line 22 to storage tank 10 thereby permitting LNG to refill chamber 46 via line 12 and assuring only liquid is delivered through meter 58. The refill is stopped when the level of LNG again rises to level 56 because the device 64 stops the return of vapor from space 20 to space 18 of tank 10 (FIG. 1). A float device 64 suitable for use with the present invention is manufactured by Armstrong Machine Works, Three Rivers, Mich., Model 11-AV. Another possibility suitable for use with the invention, is a differential pressure switch and a valve controlled thereby. This may be used instead of a float device to the same purpose.

Referring to FIG. 3, one type of device suitable for use with the present invention is illustrated. Float device 64 comprises a float chamber 68 having an LNG inlet 70 and a vapor outlet 72 in circuit with vapor return line 22. When the LNG in chamber 68 falls below that necessary to support the float element 74, element 74 drops and actuates lever arm 76 to permit vapor flow from space 20 via port 78, outlet 72 and vapor return line 22. Lever arm 76 closes outlet 72 when the LNG level 56 again rises to the illustrated level to stop the vapor flow and refill.

Referring again to FIG. 2, a temperature sensor 80 is mounted in the interior of chamber 46 and is connected to microprocessor 32 by line 82. It is desirable to deeply immerse sensor 80 in the LNG in container 46 so that the sensing element is totally in liquid and the heat path to ambient air is enlarged to permit accurate temperature measurement. The density of the LNG, which varies with temperature, is calculated by microprocessor 32 based on a signal from sensor 80. Alternatively, two pressure sensors 84 and 86 can be mounted in container 46 at known positions and electrically connected to microprocessor 32. Thus, microprocessor 32 can calculate the LNG density as a function of the differential pressure between sensors 84 and 86. In either case, microprocessor 32 calculates the density of the LNG in chamber 46 and displays the metered amount of LNG delivered to the use device on display unit 34.

At system start-up, when chamber 46 is empty and valve 16 is open, meter 58 is warm compared to the temperature of the LNG and vapor return line 22 is not blocked by device 64. LNG from storage tank 10 fills the insulated chamber 46 up to the approximate liquid level 56 illustrated in FIG. 2. Vapor return line 22 is then blocked by device 64 to stop the flow of LNG. Meter 58 is cooled both internally and externally by the LNG in chamber 46. Accordingly, meter 58 reaches the desired operating temperature before any LNG is delivered to a use device. Because meter 58 is continuously immersed in LNG during use, it remains at a relatively constant operating temperature.

As LNG is delivered to the use device, the LNG level 56 in chamber 46 may fall below the illustrated level thereby lowering the LNG level in float chamber 68. Also, heat and restrictions in line 12 may cause some of the LNG delivered to chamber 46 to boil thereby creating gas which further lowers the liquid level in chamber 46 and chamber 68. When this occurs, vapor is returned to space 18 of tank 10 through line 22 to permit LNG to re-fill chamber 46. Thus, meter 58 is continuously immersed in LNG during use and remains at a relatively constant operating temperature.

While the invention has been illustrated and described in detail in the drawings and the foregoing description, the same is to be considered as illustrative and not restrictive in character, it being understood that only the preferred embodiment has been shown and described and that all changes and modifications that come within the spirit of the invention are desired to be protected.

What is claimed is:

1. Apparatus for accurately measuring the quantity of a liquid cryogen delivered from a storage tank to a use device via a fill line, comprising:

a) an insulated container in circuit with the fill line;

b) means for maintaining a desired level of liquid cryogen in said container including means for selectively venting the vapor in said insulated container to said storage tank to control refilling of said container with liquid cryogen;

c) means, in said container below said desired level of liquid cryogen, for (i) measuring the flow rate and (ii) determining the density of liquid cryogen delivered to the use device through the fill line; and d) means for calculating, from the density and flow rate, the quantity of liquid cryogen delivered to the use device through the fill line.

2. The apparatus of claim 1 wherein said liquid cryogen is liquid natural gas (LNG).

3. The apparatus of claim 1 wherein said use device is a vehicle.

4. The apparatus of claim 1 wherein said means for selectively venting comprises a float.

5. The apparatus of claim 1 further comprising means for displaying the calculated quantity of liquid cryogen delivered to the use device.

6. The apparatus of claim 1 wherein said determining means includes a temperature sensor mounted in said container below said desired level, the LNG density being calculated as a function of the LNG temperature measured by said sensor.

7. The apparatus of claim 1 wherein said determining means includes two pressure sensors mounted at known positions in said tank below said desired level, the LNG density being calculated as a function of the differential pressure between said sensors.

8. The apparatus of claim 1 further includes means for returning vapor in the insulated container to the storage tank so only liquid will be delivered to the use device.

9. The apparatus of claim 1 further includes means for accurately measuring the temperature of the liquid.

* * * * *